March 24, 1970  K. BIERMANN ET AL  3,501,994
ANCHORING ELEMENT HAVING OBLIQUE GRIPPING INDENTATIONS
Filed May 23, 1967

INVENTORS
KURT BIERMANN
WALTER HUMMEL

BY McGlew & Toren
ATTORNEYS.

United States Patent Office

3,501,994
Patented Mar. 24, 1970

3,501,994
ANCHORING ELEMENT HAVING OBLIQUE GRIPPING INDENTATIONS
Kurt Biermann, Triesen, Liechtenstein, and Walter Hummel, Rankweil, Austria, assignors to Hilti Aktiengesellschaft, Schaan, Liechtenstein
Filed May 23, 1967, Ser. No. 640,647
Claims priority, application Germany, June 21, 1966,
H 59,726
Int. Cl. F16b *15/06*
U.S. Cl. 85—21
2 Claims

ABSTRACT OF THE DISCLOSURE

An anchoring element for anchoring materials in hard surfaces comprsing a shank portion which is pointed at one end and an impact receiving head. The shank portion is provided with knurling in the form of two groups of indentations extending obliquely in opposite direction with respect to the axis of the shank with the indentations of each group extending throughout substantially half the circumference of the shank.

SUMMARY OF THE INVENTION

This invention relates, in general, to the construction of anchoring elements and, in particular, to a new and useful anchoring element such as a bolt, nail, etc., having a shaft or shank portion which is adapted to be driven into a material and which includes a plurality of indentations thereon for improving the gripping action of the element and which are arranged so that they do not intersect.

It is known to provide anchoring elements with a knurling which is formed by a grid pattern or reticulation formation effected by cutting into the wall of the shaft portion. The so-called cross knurling increases both the anchoring value and the twist value of the anchoring element in the material and this is particularly so in respect to metal material such as iron.

A great disadvantage of the so-called cross knurling is that overstresses appear at the intersection of the indentations forming the knurling so that a number of cracks form over the surface of the shaft partly in dependence upon the quality of steel which is employed. The appearance of such cracks makes it possible for the shaft to shear off during the driving of the anchoring element into the foundation. This operation is carried out, for example, by means of a powder-force driven tool. In addition, the force of the driving will tend to increase the extent and length of the cracks which may have formed and thus materially weaken the anchoring element in respect to its holding powers. In addition, an increase of the surface cracks can also appear after the driving operation, for example, by the vibration of the material in which the element is anchored and thus increase the likelihood that the anchoring element will fail. It has been found that a considerable percentage of bolts provided with cross knurling become unusable in this manner.

In accordance with the present invention, there is provided a knurling or holding formation on the shaft or shank of an anchoring element which is formed by obliquely extending indentations or serrations made in the circumference of the shank portion at oblique angles to the axis thereof but which do not intersect. Such knurling retains the advantages of cross knurling in respect to the increase of the anchoring capability and resistance to twisting but without materially weakening the anchoring element. In accordance with a feature of the invention, the knurling is effected by forming obliquely extending indentations along the surface of the shank portion which extend in a direction in one side of the shank portion distinct from the direction of the indentations formed on the opopsite side. Preferably, the left-handed longitudinal indentations are arranged on one side of the shaft circumference and the right-handed longitudinal indentations are arranged on the opposite half of the shaft circumference.

Accordingly, it is an object of the invention to provide an anchoring element having improved knurling thereon for increasing the holding powers without decreasing the strength of the anchoring element.

A further object of the invention is to provide an anchoring element such as a bolt, nail or the like which includes indentations thereon on a partial portion of the circumference which extend obliquely in one direction and indentations on the other portion of the circumference of the anchoring element which extend in an opposite direction.

A further object of the invention is to provide an anchoring device which is simple in design, rugged in construction and economical to manufacture.

While a specific embodiment of the invention has been shown and described in detail to illustrate the application of the inventive principles, it will be understood that the invention may be embodied otherwise without departing from such principles.

DETAILED DESCRIPTION

Figure 1:
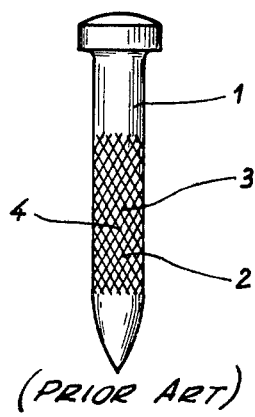
FIG. 1 is an elevational view of a nail having a cross knurling in accordance with the prior art.

Referring to the drawings, in particular, the nail 1 indicated in FIG. 1 is of a type of known construction and constitutes the prior art. The knurling 4 on the circumference of the shaft portion of the nail 1 is composed of left-handed longitudinal serrations or indentations 2 which intersect and cross right-handed longitudinal serrations or indentations 3. A knurling of this type is apt to cause the formation of cracks particularly at the location of the intersections of the serrations 2 and 3.

Figure 2:
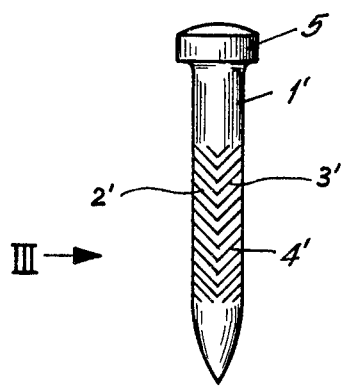
FIG. 2 is a view similar to FIG. 1 of a narrow shaft having a knurling constructed in accordance with the invention.
Figure 3:
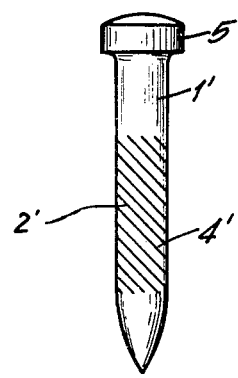
FIG. 3 is a side elevational view of the nail indicated in FIG. 2 as seen from the left-hand side in the direction of the arrow indicated III.

In accordance with the invention, as indicated in FIGS. 2 and 3, a knurling 4' is provided which is arranged intermediate the length of the shank portion of a nail 1' which in the embodiment illustrated has a head portion 5. The knurling 4' is formed by left-handed serrations or indentations made into the surface of the nail shank portion which extend at an angle to the axis of the nail and which cover only a portion of the circumference of the nail shank portion. The remaining portion of the circumference, for example, the remaining half portion, is provided with indentations or serrations 3' which are formed in a right-handed manner, that is, they extend in an opposite direction to that of the indentations 2'. The knurling is advantageously applied such that the indentations 2' and 3' do not intersect, or, if there is any overlapping or interesecting at each end of the knurlings, is is only minimal, as indicated in FIG. 2.

While a specific embodiment of the invention has been shown and described in detail to illustrate the application of the inventive principles, it will be understood that the invention may be embodied otherwise without departing from such principles.

What is claimed is:

1. An anchoring element for anchoring materials in a hard receiving material such as concrete or steel, comprising a head portion, a shank portion of uniform cylindrical diameter less than the diameter of said head portion, said shank portion terminating in a pointed tip, said shank portion including a holding area extending from said tip upwardly along a major portion of said shank portion, said holding area having knurling formed into the surface of said shank portion over substantially the whole holding area, said knurling being in the form of grooves extending inwardly from the surface of said shank portion and including a first set of grooves obliquely oriented in one direction and extending from the top to the bottom of said holding area over substantially one-half of the circumference of said shank portion, and a second set of grooves obliquely oriented in an opposite direction in respect to the axis of said shank portion and extending from the top to the bottom of said holding area over the remaining circumference of said shank portion, said first and second sets of grooves defining at their boundaries substantially V-shaped knurling, said first and second sets of grooves being arranged in continuously closely spaced pattern over the whole of said holding area and completely around the circumference of said shank portion.

2. An anchoring element according to claim 1, wherein at least some of said first and second indentations do not intersect.

References Cited

UNITED STATES PATENTS

| | | | |
|---|---|---|---|
| 438,371 | 10/1890 | Ells | 85—28 X |
| 895,846 | 8/1908 | Diers | 85—28 |
| 1,144,700 | 6/1915 | Edwards | 85—28 |
| 2,136,523 | 11/1938 | Rosenberg | 151—41.73 X |
| 2,666,252 | 1/1954 | Temple | 85—10 X |
| 2,377,903 | 4/1968 | Korte | 85—10 |
| 2,613,570 | 10/1952 | Sokolik | 85—21 |
| 2,819,641 | 1/1958 | Corckran | 85—21 |
| 3,019,460 | 2/1962 | Corckran | 85—21 |
| 3,111,045 | 11/1963 | Iwaki et al. | |

FOREIGN PATENTS

| | | |
|---|---|---|
| 615,250 | 7/1935 | Germany. |
| 565,770 | 4/1958 | Belgium. |

RAMON S. BRITTS, Primary Examiner